(12) United States Patent
Ratcliff

(10) Patent No.: US 11,093,362 B2
(45) Date of Patent: *Aug. 17, 2021

(54) PACKET FLOW TRACING IN A PARALLEL PROCESSOR COMPLEX

(71) Applicant: International Business Machines Corporation, Armonk, NY (US)

(72) Inventor: Bruce Ratcliff, Red Hook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/438,589

(22) Filed: Jun. 12, 2019

(65) Prior Publication Data

US 2019/0294521 A1 Sep. 26, 2019

Related U.S. Application Data

(63) Continuation of application No. 15/441,408, filed on Feb. 24, 2017, now Pat. No. 10,417,109, which is a
(Continued)

(51) Int. Cl.
*G06F 9/46* (2006.01)
*G06F 11/34* (2006.01)
(Continued)

(52) U.S. Cl.
CPC ............ *G06F 11/3433* (2013.01); *G06F 9/28* (2013.01); *G06F 11/3024* (2013.01);
(Continued)

(58) Field of Classification Search
CPC ...................................... G06F 9/505
(Continued)

(56) References Cited

U.S. PATENT DOCUMENTS

| 6,735,758 | B1 * | 5/2004 | Berry | G06F 11/3404 |
| | | | | 714/E11.192 |
| 7,278,058 | B1 * | 10/2007 | Narisi | G06F 11/3636 |
| | | | | 714/38.11 |

(Continued)

OTHER PUBLICATIONS

List of IBM Patents or Patent Applications Treated as Related; (Appendix P), Filed Jun. 13, 2019; 2 pages.
(Continued)

*Primary Examiner* — Mehran Kamran
(74) *Attorney, Agent, or Firm* — Cantor Colburn LLP; Steven Chiu

(57) ABSTRACT

In one example implementation, a computer-implemented method includes receiving, at a parallel processor complex, a task to be executed by the parallel processor complex. The parallel processor complex includes a trace processor and a plurality of task execution processors, each of the plurality of task execution processors having a plurality of trace buffers associated exclusively therewith. The method further includes creating, by the trace processor, a trace entry by allocating an element from a shared queue. The method further includes loading, by the trace processor, the trace entry into a common trace buffer. The method further includes loading, by the trace processor, the trace entry into one of the plurality of trace buffers based at least in part on an interface identifier and a queue pair index record. The interface identifier identifies the one of the plurality of task execution processors with which the trace entry is associated.

7 Claims, 6 Drawing Sheets

Related U.S. Application Data continuation of application No. 15/362,943, filed on Nov. 29, 2016, now Pat. No. 10,423,511.

(51) Int. Cl.

| | | |
|---|---|---|
| *G06F 11/30* | (2006.01) | |
| *G06F 9/28* | (2006.01) | |
| *G06F 11/36* | (2006.01) | |
| *G06F 15/80* | (2006.01) | |
| *H04L 12/26* | (2006.01) | |

(52) U.S. Cl.
CPC ...... *G06F 11/3461* (2013.01); *G06F 11/3466* (2013.01); *G06F 11/3636* (2013.01); *G06F 15/80* (2013.01); *H04L 43/026* (2013.01); *H04L 43/106* (2013.01)

(58) Field of Classification Search
USPC .......................................................... 718/105
See application file for complete search history.

(56) References Cited

U.S. PATENT DOCUMENTS

| | | | | |
|---|---|---|---|---|
| 9,912,566 | B1* | 3/2018 | Penno ..................... H04L 43/10 |
| 2002/0184446 | A1* | 12/2002 | Kagan ................ G06F 13/1605 | 711/130 |
| 2005/0100033 | A1* | 5/2005 | Arndt ................. H04L 67/1097 | 370/412 |
| 2006/0218447 | A1* | 9/2006 | Garcia .................... H04L 43/10 | 714/39 |
| 2006/0224928 | A1* | 10/2006 | Cardinell ............ G06F 11/3636 | 714/45 |
| 2007/0050174 | A1* | 3/2007 | DeWitt, Jr. ........ G06F 11/3636 | 702/186 |
| 2008/0263309 | A1* | 10/2008 | Attinella ............. G06F 11/3636 | 711/173 |
| 2010/0172348 | A1* | 7/2010 | Saito ...................... H04L 47/34 | 370/389 |
| 2010/0235836 | A1* | 9/2010 | Bratanov ............ G06F 11/3466 | 718/1 |
| 2010/0332869 | A1* | 12/2010 | Hsin ....................... G06F 1/329 | 713/320 |
| 2011/0219376 | A1* | 9/2011 | Williams ............ G06F 11/3466 | 718/100 |
| 2012/0095728 | A1* | 4/2012 | Ubukata .............. G06F 11/3466 | 702/186 |
| 2013/0111073 | A1* | 5/2013 | Dobbie ............... G06F 11/3495 | 710/14 |
| 2013/0151485 | A1* | 6/2013 | Kim ........................ G06F 16/23 | 707/693 |
| 2013/0254376 | A1* | 9/2013 | Kudikala ................ H04L 67/22 | 709/224 |
| 2014/0177633 | A1* | 6/2014 | Manula ................. H04L 43/028 | 370/392 |
| 2014/0189314 | A1* | 7/2014 | Kurts .................. G06F 9/30145 | 712/216 |
| 2014/0287773 | A1* | 9/2014 | Agerstam ............. H04W 48/16 | 455/456.1 |
| 2014/0301213 | A1* | 10/2014 | Khanal .................... H04L 43/04 | 370/248 |
| 2015/0049763 | A1* | 2/2015 | Michels .............. H04L 12/4604 | 370/392 |
| 2015/0269054 | A1* | 9/2015 | Kothamasu ......... G06F 11/3476 | 714/45 |
| 2015/0281036 | A1* | 10/2015 | Sun ......................... H04L 41/14 | 370/248 |
| 2016/0140014 | A1* | 5/2016 | Lampert ............. G06F 11/0781 | 714/45 |
| 2016/0246543 | A1* | 8/2016 | Williams ............ G06F 11/3636 | |
| 2017/0207986 | A1* | 7/2017 | Sundaram ............. H04L 43/062 | |
| 2017/0346675 | A1* | 11/2017 | Prokofiev ............. H04W 24/04 | |
| 2018/0054374 | A1* | 2/2018 | Chen ..................... H04L 47/365 | |

OTHER PUBLICATIONS

Ratcliff, "Packet Flow Tracing in a Parallel Processor Complex", U.S. Appl. No. 15/362,943, filed Nov. 29, 2016.
Ratcliff, "Packet Flow Tracing in a Parallel Processor Complex", U.S. Appl. No. 15/441,408, filed Feb. 24, 2017.
Ratcliff, "Packet Flow Tracing in a Parallel Processor Complex", U.S. Appl. No. 16/438,581, filed Jun. 12, 2019.

* cited by examiner

PACKET FLOW TRACING IN A PARALLEL PROCESSOR COMPLEX

DOMESTIC PRIORITY

This application is a continuation of U.S. patent application Ser. No. 15/441,408, entitled "PACKET FLOW TRACING IN A PARALLEL PROCESSOR COMPLEX," filed Feb. 24, 2017, which claims priority to U.S. patent application Ser. No. 15/362,943, entitled "PACKET FLOW TRACING IN A PARALLEL PROCESSOR COMPLEX," filed Nov. 29, 2016, the disclosure of which is incorporated by reference herein in its entirety.

BACKGROUND

The present disclosure generally relates to data processing on a computer processing systems and, more particularly, relates to packet flow tracing in a parallel processor complex.

Computer processing systems may utilize multiple processors arranged in a parallel processor complex to process task in parallel. This enables the processors to execute processes simultaneously. For example, a large task may be divided into smaller tasks which can then be executed simultaneously by the parallel processors of the parallel processor complex. Multi-core processors may also implement parallel processing techniques to execute tasks in parallel threads.

SUMMARY

According to examples of the present disclosure, techniques including methods, systems, and/or computer program products for packet flow tracing in a parallel processor complex are provided. An example method may include receiving, at the parallel processor complex, a task to be executed by the parallel processor complex, wherein the parallel processor complex comprises a trace processor and a plurality of task execution processors. The method may further include creating, by the trace processor, a trace entry by allocating an element from a shared queue. The method may further include loading, by the trace processor, the trace entry into a common trace buffer. The method may further include loading, by the trace processor, the trace entry into a host interface/queue pair index trace buffer. Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of packet flow tracing in a parallel processor complex. The parallel processor complex works on the packets in order as they are passed through a pipeline. Since lower priority traffic is injected into the pipeline less frequently, tracing these flows in a common trace buffer is not efficient. To trace these flows more efficiently, a unique trace buffer is assigned for each queue pair assigned to a host interface. This enables flows to be traced for lower priority queue pairs which are not serviced as frequently as higher priority queue pairs. The trace buffers need not be overwritten with higher priority or more frequent traffic.

Example embodiments of the disclosure include or yield various technical features, technical effects, and/or improvements to technology. Example embodiments of the disclosure provide techniques for packet flow tracing in a parallel processor complex by implementing host interface/queue pair index trace buffers for each of the processors in the parallel processor complex and a common trace buffer. These aspects of the disclosure constitute technical features that yield the technical effect of tracing flows more efficiently because a unique trace buffer is assigned to each queue pair assigned to a host processor. As a result of these technical features and technical effects, flows can more easily and efficiently be traced for lower priority queue pairs. It should be appreciated that the above examples of technical features, technical effects, and improvements to technology of example embodiments of the disclosure are merely illustrative and not exhaustive.

Figure 1:
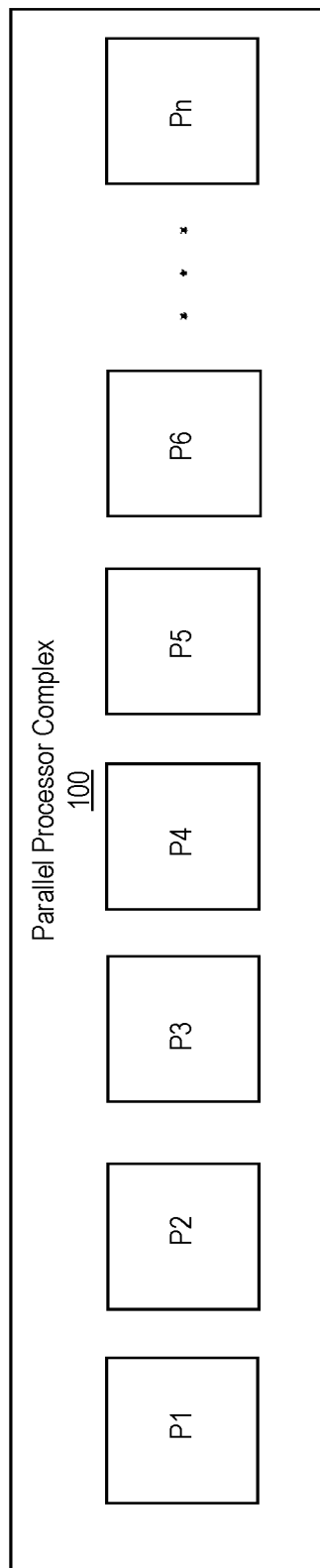
FIG. 1 illustrates a block diagram of a parallel processor complex according to examples of the present disclosure.

FIG. 1 illustrates a block diagram of a parallel processor complex 100 according to examples of the present disclosure. The parallel processor complex 100 includes N processors (i.e., P1, P2, P3, P4, P5, P6, ... Pn) all running in parallel and as part of a pipeline used for processing packet tasks. Each of the N processors is responsible for executing a portion of the packet processing task. When a particular processor completes its portion of the packet processing task, the packet is passed on to the next processor in the pipeline. For example, when P2 completes its portion of the packet processing task, the task is passed to P3 so that P3 can process its portion of the task. In this way, a pipeline is created. The pipeline can process many packets simultaneously and each packet can be from a different data stream.

Figure 2:
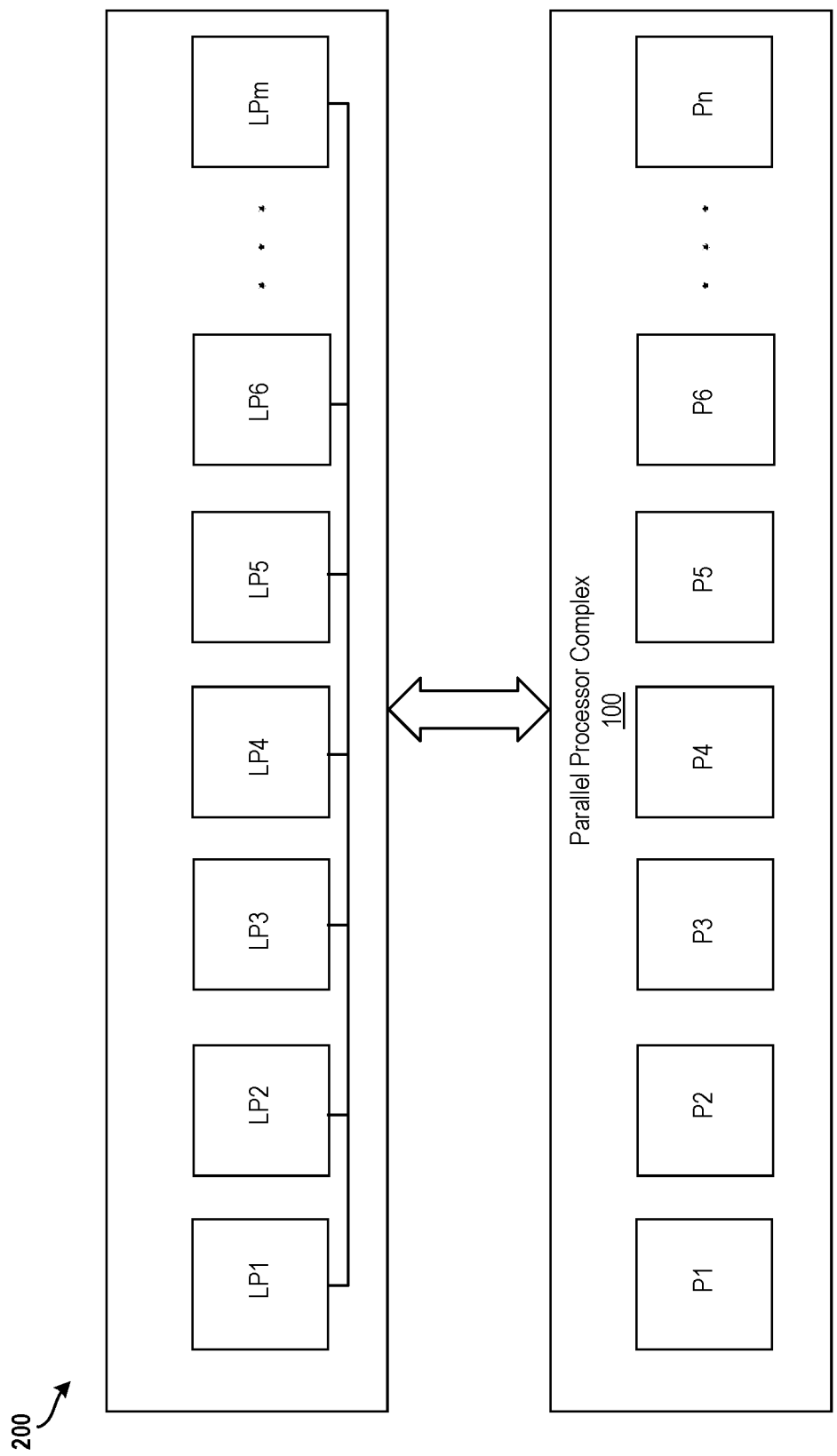
FIG. 2 illustrates a block diagram of a mainframe environment that utilizes the parallel processor complex of FIG. 1 according to examples of the present disclosure.

The parallel processor complex 100 may be implemented in a mainframe environment. For example, FIG. 2 illustrates a block diagram of a mainframe environment 200 that utilizes the parallel processor complex 100 of FIG. 1 according to examples of the present disclosure. In particular, the mainframe environment 200 may include M logical partitions (e.g., LP1, LP2, LP3, LP4, LP5, LP6, ... LPm).

According to examples of the present disclosure, each of the M logical partitions can include one or more operating systems running on the logical partition, and each of the M logical partitions can communicate with the parallel processor complex 100 using a queued type of interface. The queued interface can have multiple queue pairs, each of which may include a separate data stream or streams. Each queue pair can also be assigned a priority. Higher priority traffic may have a higher "weight" assigned to it. In such cases, more packets having a higher priority are processed.

The parallel processor complex 100 processes the packets in order as they are passed through the pipeline. Since lower priority traffic is injected into the pipeline less frequently, tracing the lower priority packets using a common trace buffer is inefficient and results in lost or overwritten trace records which are associated with the lower priority traffic.

To trace packet flows on various queued interfaces pairs (each with multiple queue pairs) a unique trace buffer is assigned to each. This enables flows to be traced for lower priority queue pairs that are not serviced as frequently as the higher priority queue pairs, without the trace buffer being overwritten with higher priority or more frequent traffic.

Figure 3:
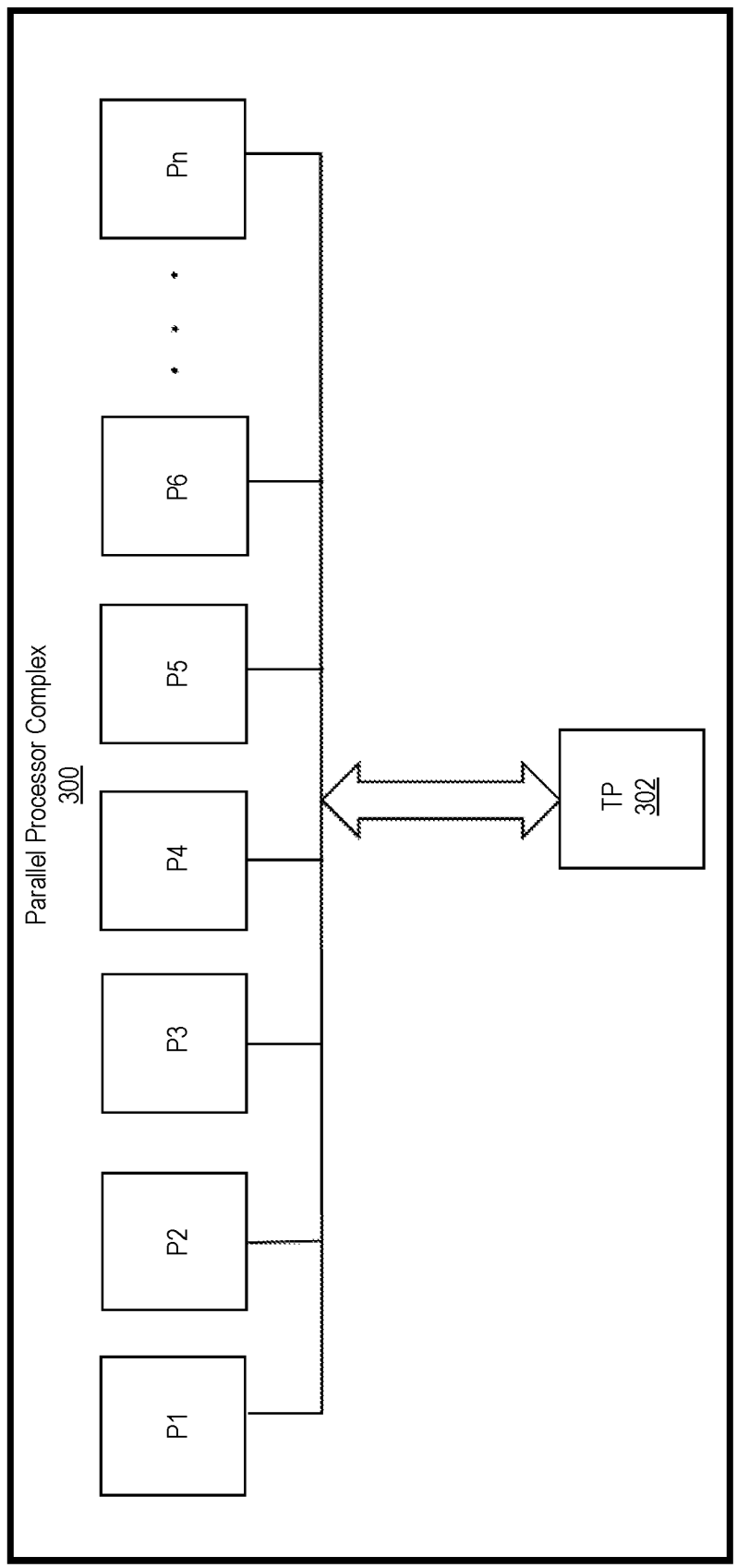
FIG. 3 illustrates a block diagram of a parallel processor complex having a dedicated trace processor to record trace information according to examples of the present disclosure.

To provide efficient and accurate tracing in a parallel processor complex, one or more processors of the N processors in the parallel processor complex is dedicated to recording trace information as illustrated in FIG. 3. In particular, FIG. 3 illustrates a block diagram of a parallel processor complex 300 having a dedicated trace processor 302 to record trace information according to examples of the present disclosure.

Figure 4:
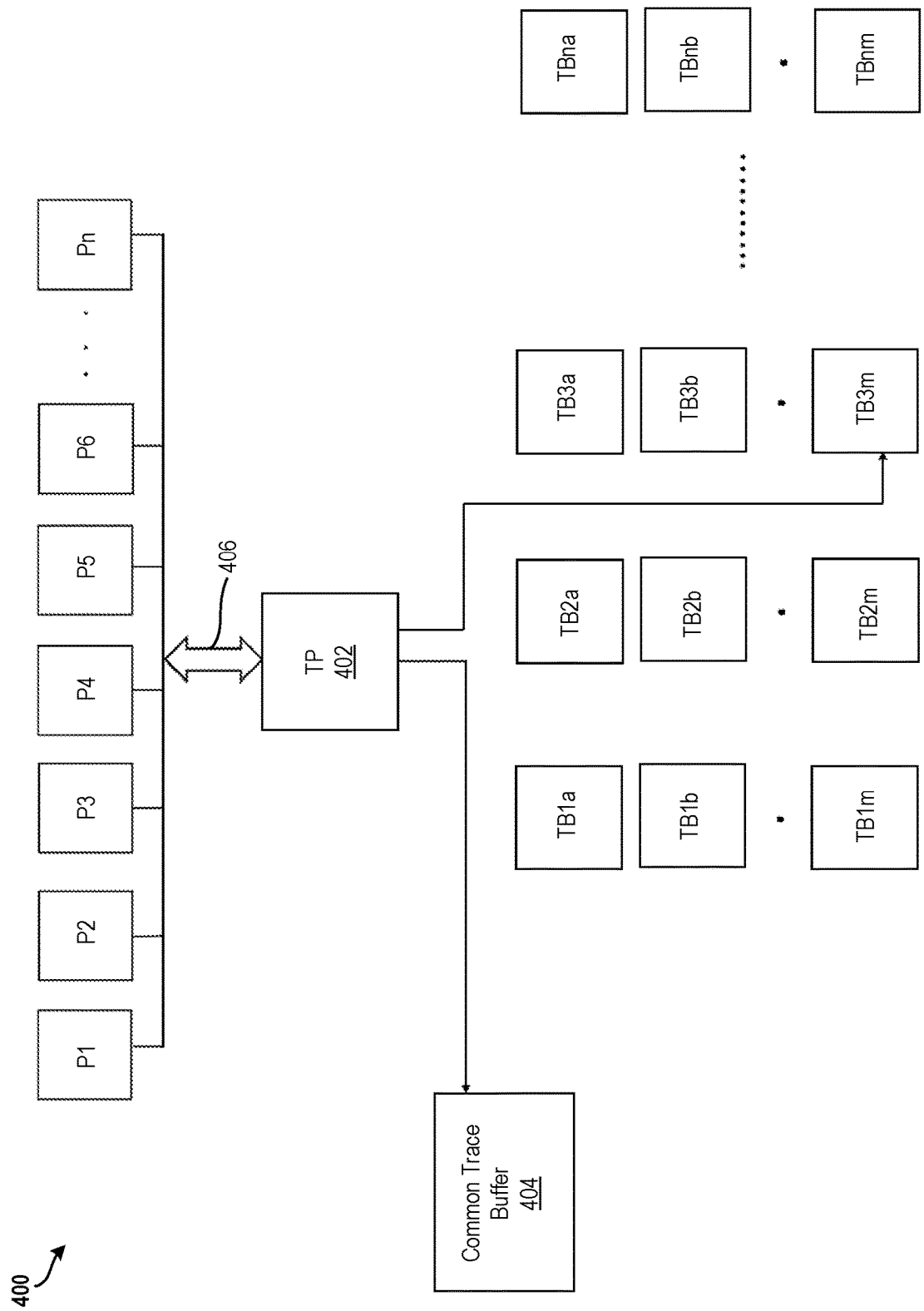
FIG. 4 illustrates a block diagram of a parallel processor complex having a dedicated trace processor to record trace information according to examples of the present disclosure.

To communicate to the tracing processors, a special queue is used as illustrated in FIG. 4. The trace processor 302 for the special queue handles requests from the N processors in the parallel processor complex 300 and ensures that trace entries are processed in the proper order.

The trace entry created by each processor shares a common header that may include the following information: processor ID, interface ID, queue pair index, tag, timestamp, and unique data. The processor ID is a unique ID of a processor (e.g., P1, P2, . . . Pn, etc.) in the parallel processor complex 300. The interface ID is a unique ID assigned to a host interface of a particular processor. The queue pair index is an index of the queue pair used to send a data stream. The tag identifies a specific trace point. The timestamp is the timestamp when the trace entry was created using a timer common to the processors (e.g., P1, P2, . . . Pn, etc.) in the parallel processor complex 300. The unique data is the data associated with the trace point (i.e., the tag).

FIG. 4 illustrates a block diagram of a parallel processor complex 400 having a dedicated trace processor 402 to record trace information according to examples of the present disclosure. To create a trace entry, each processor (e.g., P1, P2, . . . Pn, etc.) allocates an element from the shared queue 406. Each element uniquely identifies the host interface and queue pair used for that element. This information is used by the trace processor 402 to place the trace entry into a shared common trace buffer 404. Each trace entry is also placed in a host interface/queue pair index trace buffer (e.g., TB1a, TB1b, TB1m, TB2a, TB2b, TB2m, TB3a, TB3b, TB3m, TBna, TBnb, TBnm, etc.).

Using the received trace element, the dedicated trace processor (e.g., TP 402) uses the interface ID and the queue pair index record to load the trace entry into the trace buffer associated with the appropriate host and the queue pair index trace buffer. For example, a trace element for P3 includes an interface ID indicating that the trace element is associated with the host interface associated with host processor LP3, which is illustrated in FIG. 2. The trace element is added to one of the trace buffers TB3a, TB3b, TB3m associated with host processor LP3 based on the queue pair index (i.e., 1, 2, m, etc.). The trace entry is also recorded into the common trace buffer 404 to trace the current flow and other flow interactions.

Figure 5:
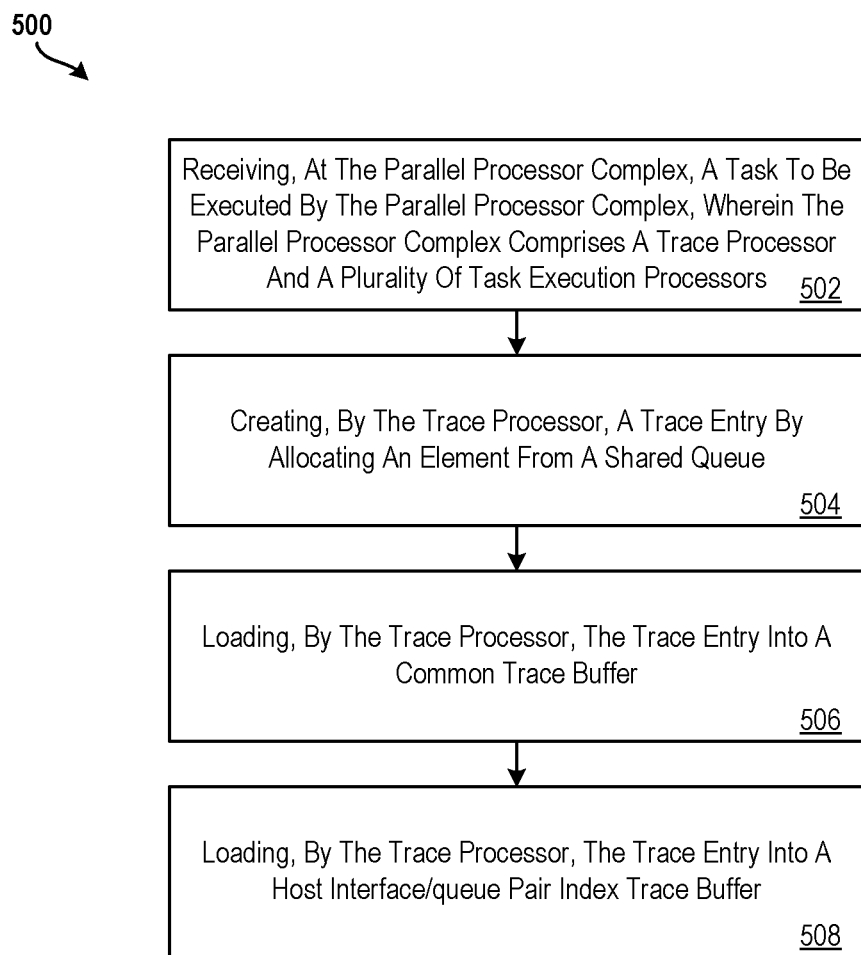
FIG. 5 illustrates a flow diagram of a method for recording trace information for a parallel processor complex using a dedicated trace processor according to examples of the present disclosure.

FIG. 5 illustrates a flow diagram of a method 500 for recording trace information for a parallel processor complex using a dedicated trace processor according to examples of the present disclosure. The method 500 may be implemented using a suitable processing system, such as the processing system 20 of FIG. 5. Reference is made to FIG. 4 in describing the method 500 as one possible example implementation.

At block 502, the method 500 includes receiving, at the parallel processor complex (e.g., the parallel processor complex 400), a task to be executed by the parallel processor complex. The parallel processor complex may include a trace processor (e.g., the trace processor 402) and a plurality of task execution processors (e.g., the processors P1, P2, P3, P4, P5, P6, . . . Pn).

At block 504, the method 500 includes creating, by the trace processor, a trace entry by allocating an element from a shared queue (e.g., the shared queue 406). In examples, the element uniquely identifies the host interface and queue pair used for the element.

At block 506, the method 500 includes loading, by the trace processor, the trace entry into a common trace buffer (e.g., the common trace buffer 404).

At block 508, the method 500 includes loading, by the trace processor, the trace entry into a host interface/queue pair index trace buffer (e.g., TB1a, TB1b, TB1m, TB2a, TB2b, TB2m, TB3a, TB3b, TB3m, TBna, TBnb, TBnm, etc.). According to examples of the present disclosure, the trace processor uses an interface identifier and a queue pair index record to load the trace entry into the trace buffer. The interface identifier may identify a host interface of the plurality of host interfaces. Also, the queue pair index record may indicate which host interface/queue pair index trace buffer is to be loaded with the trace entry.

Additional processes also may be included. For example, the method 500 may additionally include selecting, by the trace processor, the host interface/queue pair index trace buffer based on an interface identifier that indicates a particular host interface processor. It should be understood that the processes depicted in FIG. 5 represent illustrations, and that other processes may be added or existing processes may be removed, modified, or rearranged without departing from the scope and spirit of the present disclosure.

The various components, modules, engines, etc. described herein may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by the processing device implement the engines described herein. Other engines may also be utilized to include other features and functionality described in other examples herein.

Alternatively or additionally, the present techniques may be implemented using dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 6:
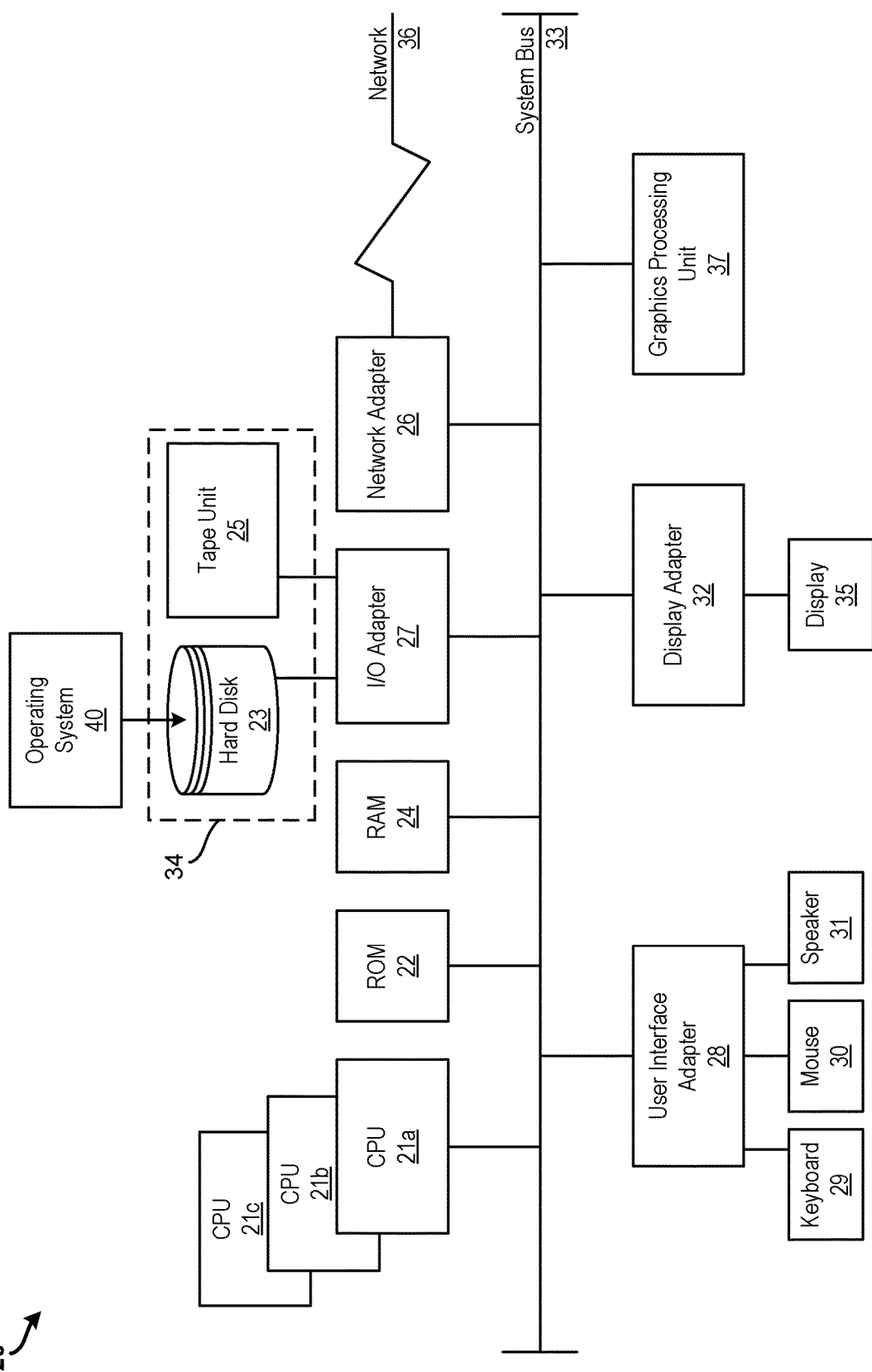
FIG. 6 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 6 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for packet flow tracing in a parallel processor complex, the method comprising:
    receiving, at the parallel processor complex, a task to be executed by the parallel processor complex, wherein the parallel processor complex comprises a trace processor and a plurality of task execution processors, each of the plurality of task execution processors having a plurality of trace buffers associated exclusively therewith;
    creating, by the trace processor, a trace entry by allocating an element from a shared queue;
    loading, by the trace processor, the trace entry into a common trace buffer; and
    loading, by the trace processor, the trace entry into one of the plurality of trace buffers based at least in part on an interface identifier and a queue pair index record, the interface identifier identifying the one of the plurality of task execution processors with which the trace entry is associated.

2. The computer-implemented method of claim 1, wherein the element uniquely identifies a host interface and a queue pair used for the element.

3. The computer-implemented method of claim 1, wherein the trace entry comprises a header.

4. The computer-implemented method of claim 3, wherein the header comprises a processor identifier, at interface identifier, a queue pair index, a tag, a timestamp, and unique data.

5. The computer-implemented method of claim 4, wherein the processor identifier is a unique identifier of a processor in the parallel processor complex, the interface identifier is a unique identifier assigned to a host interface of a particular processor in the parallel processor complex, the queue pair index is an index of the queue pair used to send a data stream, the tag identifies a specific trace point, the timestamp is a time when the trace entry was created using a timer common to the plurality of task execution processors, and the unique data is data associated with the tag.

6. The computer-implemented method of claim 1, wherein the trace processor uses the interface identifier and the queue pair index record to load the trace entry into the common trace buffer.

7. The computer-implemented method of claim 1, wherein the queue pair index record indicates to which of the plurality of trace buffers to load the trace entry.

* * * * *